Patented Aug. 11, 1931

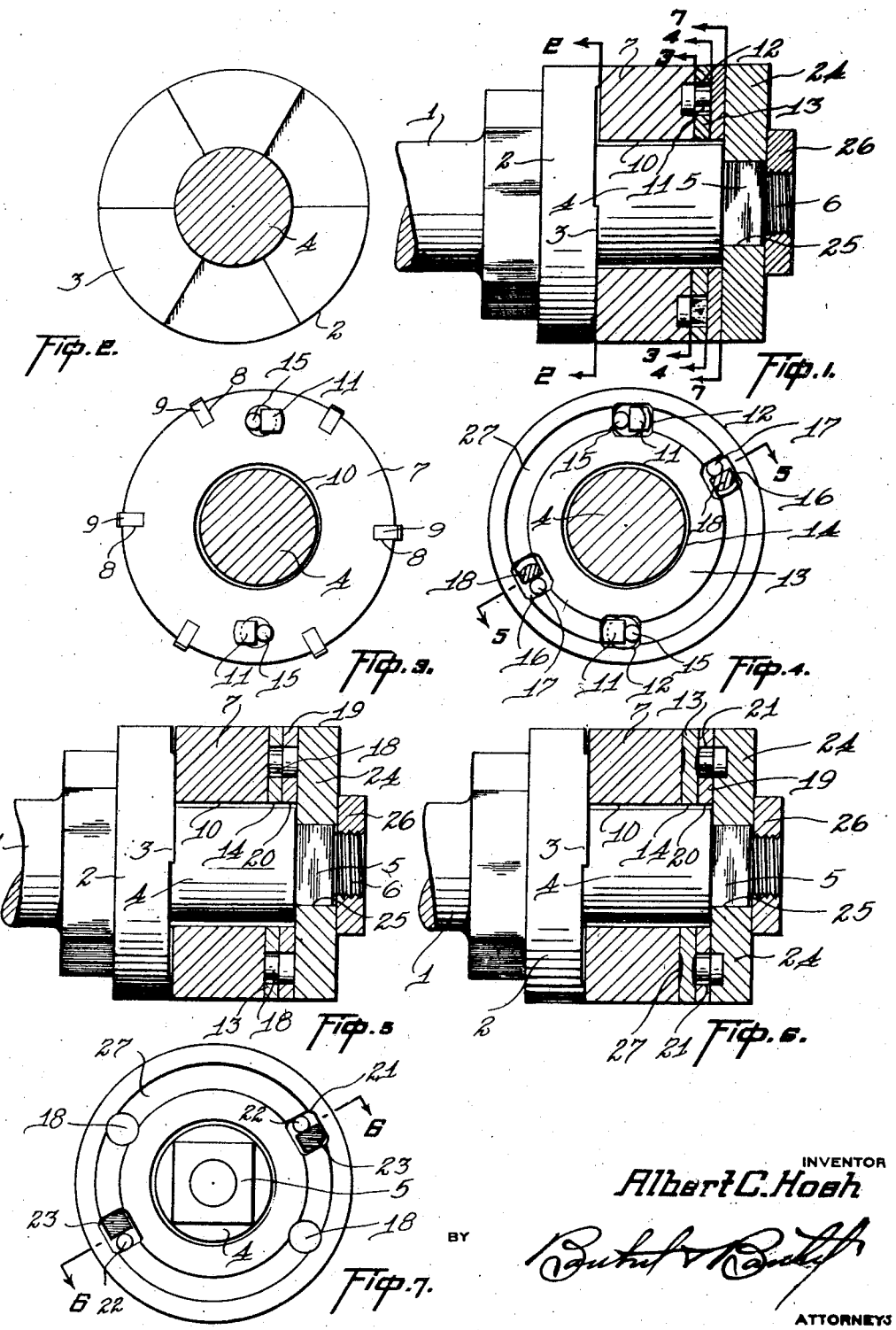

1,818,621

UNITED STATES PATENT OFFICE

ALBERT C. HOEH, OF ROYAL OAK, MICHIGAN

REAMER

Application filed January 6, 1930. Serial No. 418,687.

The present invention pertains to a novel reamer and constitutes an improvement in the class of reamers disclosed in my Patent No. 1,218,862, granted March 13, 1917.

The primary object of the present invention is to provide a reamer of the present type which is devised in a manner attaining the highest possible degree of simplicity and practicability, and which is readily accessible for repairs and replacement of the reamer body.

Another object of the present invention is to devise a reamer capable of shifting or floating relatively to the power applied, thereby relieving the reamer of stresses and strains that are ordinarily set up between the cutter head and the shank of the reamer, when the same is placed in operation.

A further object of the present invention is to furnish a reamer with a novel floating cutter head that can accommodate or adjust itself to the piece of work to be performed, thereby insuring precision and a uniform or equal distribution of power to the cutters or bits of the cutter head.

With the above and other ends in view the invention consists in the matters hereinafter set forth and more particularly pointed out in the appended claims, reference being had to the accompanying drawings, in which Figure 1 is a longitudinal cross section through the present reamer mounted upon a shank;

Fig. 2 is a cross sectional view of the shank, taken on the line 2—2 of Fig. 1;

Fig. 3 is a cross sectional view taken on the line 3—3 of Fig. 1;

Fig. 4 is a cross sectional view taken on the line 4—4 of Fig. 1;

Fig. 5 is a cross sectional view taken on the line 5—5 of Fig. 4;

Fig. 6 is a cross sectional view taken on the line 6—6 of Fig. 7, and

Fig. 7 is a transverse cross section taken on the line 7—7 of Fig. 1.

Like characters are employed throughout to designate the corresponding parts.

The numeral 1 denotes a tapered reamer shank having a tang (not shown) provided on its smaller end and its larger end terminating in a circular head 2 having the three point sector-shaped bearing surfaces 3. The head 2 has a concentric longitudinally projecting cylindrical body 4 formed integrally thereon, the outer face of the cylindrical body being provided with a squared or angular portion 5 from which projects a screw-threaded stem 6.

A reamer body 7 is formed with an external diameter as great as or greater than the diameter of the head 2 and is provided with peripheral radially disposed grooves 8 in which are suitably secured the cutter blades or bits 9. The reamer body is provided with a central bore 10 so that it may be placed over the cylindrical body 4 to lie flat against the head 2, the bore 10 being provided with a diameter which is larger than the diameter of the cylindrical body to permit the reamer body to move laterally.

The outer face of the reamer body is provided with a pair of outwardly projecting semi-circular lugs 11 which project into perforations 12 in a disk 13 which is provided with a centrally located opening 14 of greater diameter than the cylindrical body 4 to permit it to be placed over the latter. The lugs, as illustrated in Fig. 4, are made of less cross sectional area than the perforations and the rollers 15 are inserted between certain faces of the perforations and lugs to prevent any play circumferentially but to permit play in a radial direction. The disk 13 is provided with a similar pair of perforations 16 to receive the rollers 17 and the lugs 18 which are mounted on a similarly shaped disk 19 having a central opening 20 of greater diameter than the cylindrical body 4. The disk 19 has a pair of perforations 21, similar to those above described, to receive the rollers 22 and the lugs 23 which are mounted on a disk 24 having an opening 25 of similar angularity to the angular portion 5 so that the disk is keyed thereto. A nut 26 is screwed on the threaded stem 6 to hold the disk 24 on the angular portion 5 and against the end of the cylindrical body which also acts as a spacer.

From the above description it becomes apparent that the disk 24 is keyed to the shank and rotates therewith. The inter-engaging lugs, rollers and perforations in the disks 13 and 19 and the lugs on the reamer body and on the disk 24 engaging in perforations in the disks 13 and 19 respectively provide a connection whereby the reamer body is driven from the disk 24. This manner of driving connection gives a positive rotary drive and yet it permits the disks 13 and 19 and the reamer body 6 to move radially relative to the disk 24 and relative to the shank. This lateral movement providing the self-adjusting means which permits the present means to adapt itself to the work to be performed.

The disks 13 and 19 are provided with circular shallow grooves 27 on their flat faces, the grooves being located adjacent the rollers which are placed in the above described perforations. The grooves are formed thus in order to insure floating movement of the reamer body for when the edges of the perforations become scored or burred the portion raised thereby merely projects into this groove and does not contact with the face of the next disk. If the rollers, lugs or walls of the perforations become worn slightly there would be a tendency for the roller to tilt and the ends would bind against the adjacent disks and by placing the grooves on the faces of the disks the tilting of the rollers would not cause a binding action because they would merely project into the grooves.

Although a specific embodiment of the present invention has been illustrated and described, it is to be understood that various changes may be made within the scope of the appended claims without departing from the spirit of the invention, and such changes are contemplated.

What I claim is:

1. A reamer comprising a shank, a reamer body loosely mounted on said shank, a disk fixedly mounted on said shank, a plurality of loosely mounted disks between said reamer body and said fixed disk, lugs mounted on said reamer body, fixed disk and certain of said loosely mounted disks and adapted to engage in perforations in said loosely mounted disks to provide a rotary driving connection permitting lateral movement of said reamer body relative to said shank.

2. A reamer comprising a shank, a reamer body loosely mounted on said shank, a disk fixedly mounted on said shank, a plurality of loosely mounted disks between said reamer body and said fixed disk, lugs mounted on said reamer body, fixed disk and certain of said loosely mounted disks and adapted to extend into perforations in said floating disks, said lugs having a smaller cross sectional area than said perforations whereby lateral movement of said reamer relative to said shank is permitted.

3. A reamer comprising a shank, a reamer body loosely mounted on said shank, a disk fixedly mounted on said shank, a plurality of loosely mounted disks between said reamer body and said fixed disk, perforations in said loosely mounted disks, lugs mounted on said reamer body, fixed disk and certain of said loosely mounted disks, said lugs having a smaller cross sectional area than said perforations, and rollers mounted between certain faces of said lugs and perforations whereby a rotary driving connection is established which permits lateral movement of said reamer relative to said shank.

4. A reamer comprising a shank having a head formed thereon, a cylindrical body formed on said head concentric with said shank, a reamer body loosely mounted on said cylindrical body, an angular portion formed on the end of said cylindrical body, a disk having a bore of corresponding angularity secured on said angular portion, a plurality of loosely mounted disks between said reamer body and said fixed disk, outwardly projecting lugs mounted on said reamer, said fixed disk and certain of said loosely mounted disks, and perforations in said loosely mounted disks adapted to receive said lugs and establish a rotary driving connection between said fixed disk and said reamer whereby the latter may be moved laterally.

5. A reamer comprising a shank having a head formed thereon, a cylindrical body formed on said head concentric with said shank, a reamer body loosely mounted on said cylindrical body, an angular portion formed on the end of said cylindrical body, a disk having an opening of corresponding angularity secured on said angular portion, a plurality of loosely mounted disks between said reamer body and said fixed disk, outwardly projecting lugs mounted on said reamer, said fixed disk and certain of said loosely mounted disks, rollers mounted adjacent said lugs, and perforations in said loosely mounted disks adapted to receive the lugs on the member adjacent thereto and said rollers to establish a rotary driving connection between said fixed disk and said reamer whereby the latter may be moved laterally.

6. A reamer comprising a shank having a head formed thereon, a cylindrical body formed on said head concentric with said shank, a reamer body loosely mounted on said cylindrical body, an angular portion formed on the end of said cylindrical body, a disk having an opening of corresponding angularity secured on said angular portion, a plurality of loosely mounted disks between said reamer and said fixed disk, outwardly projecting lugs mounted on said reamer, said fixed disk and certain of said loosely mounted disks, rollers mounted adjacent said lugs, and perforations in said loosely mounted disks adapted to receive the lugs on the member adjacent thereto and the rollers, said lugs and rollers being of smaller cross sectional width than said perforations to permit movement of said lugs and rollers in said perforations in a lateral direction whereby a rotary driving connection is established between said reamer and said shank which permits lateral movement of said reamer relative to the shank.

In testimony whereof I affix my signature.

ALBERT C. HOEH.